US010570065B1

(12) United States Patent
Yang et al.

(10) Patent No.: US 10,570,065 B1
(45) Date of Patent: Feb. 25, 2020

(54) METHOD OF FABRICATING GREEN DESICCANT WHEEL

(71) Applicant: Institute of Nuclear Energy Research, Atomic Energy Council, Executive Yuan, R.O.C., Taoyuan (TW)

(72) Inventors: Sheng-Fu Yang, New Taipei (TW); To-Mei Wang, New Taipei (TW); Chi-Tzeng Hsu, Taoyuan (TW); Heng-Yi Li, New Taipei (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 0 days.

(21) Appl. No.: 16/153,942

(22) Filed: Oct. 8, 2018

(51) Int. Cl.
| | |
|---|---|
| *C04B 41/45* | (2006.01) |
| *C04B 41/48* | (2006.01) |
| *C04B 41/00* | (2006.01) |
| *C04B 35/64* | (2006.01) |
| *C04B 35/44* | (2006.01) |
| *C22B 21/06* | (2006.01) |
| *C04B 103/00* | (2006.01) |
| *C04B 111/00* | (2006.01) |
| *C04B 111/40* | (2006.01) |

(52) U.S. Cl.
CPC .......... *C04B 41/4578* (2013.01); *C04B 35/44* (2013.01); *C04B 35/64* (2013.01); *C04B 41/009* (2013.01); *C04B 41/4803* (2013.01); *C04B 41/4838* (2013.01); *C04B 41/4876* (2013.01); *C04B 41/4884* (2013.01); *C04B 2103/0078* (2013.01); *C04B 2103/0079* (2013.01); *C04B 2111/00224* (2013.01); *C04B 2111/40* (2013.01); *C04B 2235/3217* (2013.01); *C22B 21/066* (2013.01)

(58) Field of Classification Search
CPC ..... C04B 41/4578; C04B 35/44; C04B 35/64; C04B 41/009; C04B 41/4803; C04B 41/4838; C04B 41/4876; C04B 41/4884
See application file for complete search history.

(56) References Cited

U.S. PATENT DOCUMENTS

| | | | | |
|---|---|---|---|---|
| 5,580,369 | A * | 12/1996 | Belding | ............... B01D 53/261 162/164.2 |
| 5,733,451 | A * | 3/1998 | Coellner | ................ B01D 53/02 210/496 |
| 2003/0056884 | A1* | 3/2003 | Belding | ................ B01J 20/103 156/205 |

* cited by examiner

*Primary Examiner* — James A Fiorito
(74) *Attorney, Agent, or Firm* — Jackson IPG PLLC; Demian K. Jackson

(57) ABSTRACT

A method is provided to fabricate a green desiccant wheel. A green recycled adsorbent material of aluminum hydroxide and alumina is extracted and used as a base material to be added to a 3-dimensional (3D) network skeleton of a foam support. Through sintering, surface is hardened with the material adsorbed to megapores uniformly distributed. Thus, an adsorbent material of porous ceramic having pores on surface is made. The area contacting with moist air is increased. The moisture-adsorbing capacity is improved. At last, the whole procedure is integrated to develop a high-efficiency green desiccant wheel. Thus, the reusable materials are kept at innate grade or upgraded for recycling and regenerating. New materials and products can be further fabricated. The present invention helps solving environmental problem of wastes. Life cycle of resource is lengthened. A sample of recycling economy is innovated. Industrial efficiency is effectively enhanced.

6 Claims, 3 Drawing Sheets

METHOD OF FABRICATING GREEN DESICCANT WHEEL

TECHNICAL FIELD OF THE INVENTION

The present invention relates to fabricating a green desiccant wheel; more particularly, to developing an effective method and technique (including purifying, refining and synthesizing) for producing an environment-protected green adsorbent (of aluminum hydroxide and alumina) by recycling the wastes (aluminum dross) of aluminum production industries.

DESCRIPTION OF THE RELATED ARTS

Aluminum production industries purify aluminum dross to replace the raw material of alumina for producing high-aluminum refractory brick. Thus, aluminum dross is recycled for producing resourced products. There are considerable researches and developments for the distribution of the industrial wastes as well as the processing and green-materializing of aluminum dross already.

Currently, the raw material of aluminum hydroxide is obtained by the exploitation of natural bauxite to produce ceramic materials through physical and chemical refinement. The precursor of an alumina material is bauxite, too. After purification, the preparation methods are mainly fixed calcination and rotary-kiln calcination. These two methods require prolonged calcination and subsequent processes of milling and sieving. A great amount of investment on time and energy is necessary. Energy consumption and carbon dioxide emission are increased. The processes are relatively non-economical and non-environmental. The ownership of existing raw material is increasingly concentrated.

For facing the monopolization of the raw material by multinational corporations with the price manipulated by them as well, environmental problems have to be solved and the bottleneck breakthrough of raw-material cost is necessary. Hence, the prior arts do not fulfill all users' requests on actual use.

SUMMARY OF THE INVENTION

The main purpose of the present invention is to develop an effective method and technique (including purifying, refining and synthesizing) for producing an environment-protected green adsorbent (of aluminum hydroxide and alumina) by recycling the wastes (aluminum dross) of aluminum production industries, where reusable materials are kept at innate grade or upgraded for recycling and regenerating; and new materials and products are further fabricated.

Another purpose of the present invention is to use a green recycled adsorbent material of aluminum hydroxide and alumina as a base material to be added to a network skeleton of a foam carrier and remove the foam contained within to obtain a porous ceramic wheel having the porous network skeleton through sintering, where the wheel has good chemical stability, mechanical strength and high-temperature resistance and is non-powdered, non-aging, and reusable after washing; the environmental problem of the wastes is solved; the life cycle of resource is lengthened; a sample of recycling economy is innovated; and industrial efficiency is effectively enhanced.

To achieve the above purposes, the present invention is a method of fabricating a green desiccant wheel, comprising steps of: (a) purification and extraction of aluminum dross, (b) preparation of slurry, (c) treatment of forming, and (d) treatment of drying and sintering, where uncalcined aluminum dross is added with an aqueous alkaline solution to obtain a sodium aluminate solution with aluminum element extracted; a high-purity adsorbent material of aluminum hydroxide and alumina is obtained thereby; by using the adsorbent material of aluminum hydroxide and alumina as a base material, 0.1~50 percent (%) of a rheological additive, 0.1%~30% of an anti-foaming agent and 0.1%~60% of an aggregating agent are added to form a ceramic slurry with viscous flow improved and bridging reduced; the ceramic slurry is added to a carrier material having a 3-dimensional (3D) network skeleton; in a sintering process, the carrier material is removed through high-temperature combustion to obtain a reusable recycled desiccant wheel; the desiccant wheel has a porous ceramic wheel body with interpenetrating pores; the desiccant wheel is of the 3D porous network skeleton with open cells and the pores have diameters bigger than 100 nanometers; the pores are uniformly distributed on the surface of the porous ceramic wheel body to obtain the desiccant wheel of the composite adsorbent material with porous surface; and the porous ceramic wheel body of the desiccant wheel has a diameter of 1~120 centimeters (cm), a pores density of 10~60 pores per inch, a porosity of 60~85%, a flexural strength greater than 20 kilogram-force per square centimeter and a thickness of 10~100 cm. Accordingly, a novel method of fabricating a green desiccant wheel is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
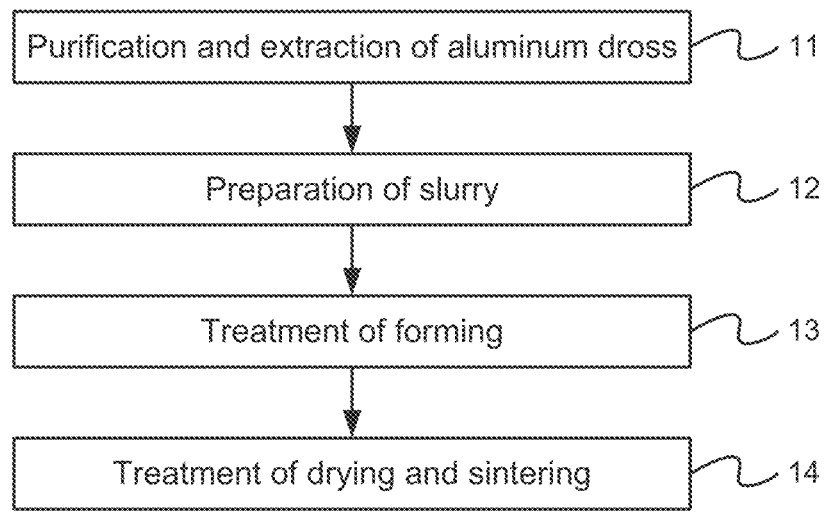
FIG. 1 is the flow view showing the preferred embodiment according to the present invention.
Figure 2:
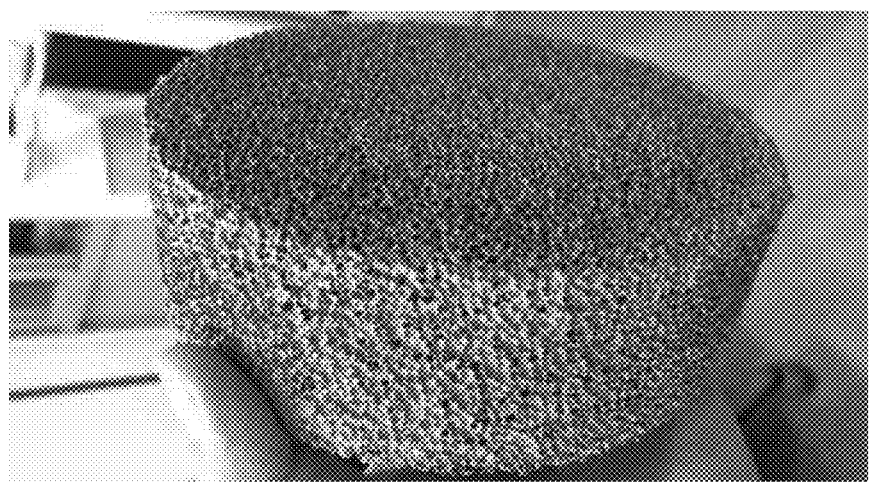
FIG. 2 is the perspective view showing the desiccant wheel.
Figure 3:
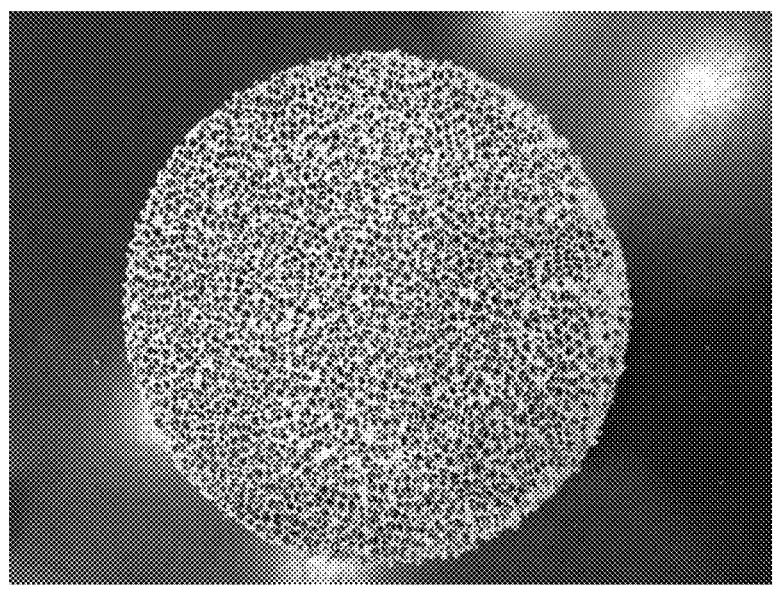
FIG. 3 is the top-down view showing the desiccant wheel.

Please refer to FIG. 1 to FIG. 3, which are a flow view showing a preferred embodiment according to the present invention; and a perspective view and a top-down view showing the desiccant wheel. As shown in the figures, the present invention develops an effective method and technology for regeneration of materializing the wastes (aluminum dross) generated by aluminum production industries. A production technology (including purifying, refining and synthesizing) for an environment-perpetuated green adsorbent material (of aluminum hydroxide and alumina) is developed. The reusable materials are kept at innate grade or upgraded for recycling and regenerating. New materials and products are further fabricated. The environmental problem of the wastes is solved. Life cycle of related resource is lengthened. A sample of recycling economy is innovated. Industrial efficiency is effectively enhanced. The present invention is a method of fabricating a green desiccant wheel, where a green recycled adsorbent material is used as a base material to make a honeycomb wheel to be further integrated for fabricating the green desiccant wheel with efficiency. The present invention comprises the following steps:

(a) Purification and extraction of aluminum dross 11: The waste of uncalcined aluminum dross is added with an aqueous alkaline solution to obtain a sodium aluminate solution where aluminum element is extracted and a pH value of 10~14 is obtained. Thereby, a high-purity adsorbent material of aluminum hydroxide and alumina is obtained.

(b) Preparation of slurry 12: By using the adsorbent material of aluminum hydroxide and alumina as a base material, 0.1%~50 percent (%) of a rheological additive, 0.1%~30% of an anti-foaming agent and 0.1%~60% of an aggregating agent are added to form a ceramic slurry with viscous flow improved and bridging reduced.

(c) Treatment of forming 13: The ceramic slurry is added to a carrier material having a 3-dimensional (3D) network skeleton.

(d) Treatment of drying and sintering 14: In a sintering process, the carrier material is removed through high-temperature combustion to generate a reusable recycled desiccant wheel. The desiccant wheel has a porous ceramic wheel body with interpenetrating pores. The desiccant wheel is of the 3D porous network skeleton with open cells and the pores have diameters bigger than 100 nanometers (nm). The pores are uniformly distributed on the surface of the porous ceramic wheel body. Hence, the desiccant wheel becomes a composite adsorbent material of porous ceramic with pores on surface. Therein, the porous ceramic wheel body of the desiccant wheel has a diameter of 1~120 centimeters (cm), a pores density of 10~60 pores per inch (PPI), a porosity of 60~85%, a flexural strength greater than 20 kilogram-force per square centimeter and a thickness of 10~100 cm. Thus, a novel method of fabricating a green desiccant wheel is obtained.

In step (a), Taguchi experimental design is applied to experimental plans for the purification and extraction of high-purity aluminum hydroxide from the waste of an aluminum production industry. The time for required try-and-error is reduced; the best recycling ratio and the operational efficiency parameters of the purification and extraction are defined; and verification of pre-production is accelerated for industrial application. For the purification and extraction of aluminum dross, an aqueous alkaline solution must be added to extract aluminum element to form a sodium aluminate solution. The water of the aqueous alkaline solution will be consumed during the purification and extraction to reduce the amount and concentration. By supplying water and sodium hydroxide, the concentration is adjusted for recycling. Required waste water treatment and production cost are reduced. The purification and extraction of the adsorbent material of aluminum hydroxide achieve an efficiency rate more than 90% with a purity greater than 99%. The aluminum dross is effectively recycled into a ceramic material of aluminum hydroxide. Thus, the cost of aluminum dross, the environmental impact by waste disposal, the cost of raw-material mining and production, the emission of greenhouse gas, the resource consumption and the environmental non-economy are reduced; the efficiency of resource utility is increased; and the green-material technology is commercialized. Then, a kernel high-temperature fusion process is used to develop a refinery, pretreatment and collection technology of alumina for producing high-purity alumina, so as to solve the problem of more and more concentrated ownership of the raw material where the raw material is monopolized by multinational corporations and its price is manipulated by them as well. The bottleneck on the cost of the raw material is effectively broken through for creating a novel ceramic-material market.

In step (c), as is known, ceramics having pore sizes greater than 50 nm are categorized as macroporous ceramics. The macroporous ceramics have ceramic slurry adsorbed on flammable foam plastic porous carrier through squeezing or have ceramic slurry injected in polyurethane sponge having interpenetrating pores by using a plastic forming technique or a polymeric sponge method, respectively. In step (d), high-temperature combustion removes the carrier material to form pores having big sizes (>100 nm) with regularity. The organic foam material suitable for this molding method generally requires a product of polymeric foam through a specific foaming technology. The polymeric foam is usually made of polyurethane, polyvinyl chloride, polystyrene, silicone, cellulose or the like. In practical general uses, soft polyurethane foaming materials are chosen because of its low softening temperature for avoiding thermal stress damage during exhausting volatiles. Thereby, the porous skeleton is prevented from collapsing and the strength of the specimen is maintained. The pore size of the porous organic foaming material decides the pore size of the porous ceramics (typically 5~60 PPI). Therefore, the organic foaming material is selected according to the pore size and porosity as planned. The present invention fabricates the desiccant wheel whose porous ceramic wheel body has the open-celled 3D porous network skeleton. Besides, the pores are interpenetrating. Hence, the wheel can be used in molten metal filters, hot gas filters, power-plant exhaust-gas particle removers and porous electrodes and catalyst carriers of solid oxide fuel cell.

In FIG. 2 and FIG. 3, the recycled adsorbent material of aluminum hydroxide and alumina is used as the base material to be added into the foamed carrier having the 3D network skeleton. Through sintering, the foam is removed to obtain the porous ceramic wheel having the open-celled 3D porous network skeleton. The wheel has good chemical stability, mechanical strength and high-temperature resistance, together with the benefit of being non-powdered, non-aging, and reusable after washing.

Thus, the present invention develops a method for the purification and extraction of aluminum dross, where a green recycled adsorbent material of aluminum hydroxide and alumina is extracted and used as a base material to be added into a foamed carrier having a 3D network skeleton. Through sintering, the foam is removed to obtain a porous ceramic wheel having the open-celled 3D porous network skeleton. The porous ceramic wheel is used as a main body to be added with aluminum hydroxide and an active alumina adsorption monomer. After sintering at a high temperature, the surface is hardened and the adsorbent material is adhered to the megapores inside. A lot of pores are uniformly distributed on the surface of the porous ceramic wheel. The composite adsorbent material of porous ceramic having surface pores is made. The area contacting with moist air is increased for improving absorption capacity. At last, the whole procedure is integrated to complete the development of a high-efficiency green desiccant wheel. Accordingly, the desiccant wheel has the following advantages:

1. Good chemical stability;
2. Proper mechanical strength;
3. Operation in a high-temperature environment;
4. Non-powdered and non-aging;
5. 3D porous composite ceramic channels and structure;
6. Millimeter and nanometer porous composite adsorbent channels and structure;

7. Increased area contacting with moist air for improving absorption capacity;
8. A vapor adsorption capacity of desiccant wheel greater than 20%; and
9. A drying capacity of desiccant wheel greater than 200 grams per hour.

To sum up, the present invention is a method of fabricating a green desiccant wheel, where an effective method and technique (including purifying, refining and synthesizing) is developed for producing an environment-protected green adsorbent (of aluminum hydroxide and alumina) by recycling the wastes (aluminum dross) of aluminum production industries; reusable materials are kept at innate grade or upgraded for recycling and regenerating into new materials and products; the environmental problem of the wastes is solved; life cycle of resource is lengthened; a sample of recycling economy is innovated; and industrial efficiency is effectively enhanced.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a green desiccant wheel comprising steps of:
   (a) purification and extraction, wherein uncalcined aluminum dross is mixed with an aqueous alkaline sodium solution to obtain a sodium aluminate solution; elemental aluminum is extracted from the sodium aluminate solution; and an adsorbent material of aluminum hydroxide and alumina is obtained thereby;
   (b) preparing a slurry using said adsorbent material of aluminum hydroxide and alumina as a base material to form a ceramic slurry;
   (c) treatment of forming, wherein said ceramic slurry is added to a flammable porous carrier material having a 3-dimensional (3D) porous network skeleton; and
   (d) treatment of drying and sintering, wherein, in a sintering process, said carrier material is removed through high-temperature combustion to obtain a reusable recycled desiccant wheel; said desiccant wheel has a porous ceramic wheel body with interpenetrating pores; said desiccant wheel is of said 3D porous network skeleton with open cells and said pores have diameters bigger than 100 nanometers (nm); said pores are uniformly distributed on the surface of said porous ceramic wheel body to obtain said desiccant wheel of said composite adsorbent material with porous surface; and said porous ceramic wheel body of said desiccant wheel has a diameter of 1~120 centimeters (cm), a pores density of 10~60 pores per inch, a porosity of 60~85%, a flexural strength greater than 20 kilogram-force per square centimeter and a thickness of 10~100 cm.

2. The method according to claim 1, wherein, in step (a), said aqueous alkaline sodium solution contains sodium hydroxide and has a pH value of 10~14.

3. The method according to claim 1, wherein said adsorbent material of aluminum hydroxide and alumina has a purity greater than 99%.

4. The method according to claim 1, wherein, in step (c), said treatment of forming uses a plastic forming technique to adsorb said ceramic slurry on said carrier material through pressing, said carrier material being made of plastic form.

5. The method according to claim 1, wherein, in step (c), said treatment of forming inputs said ceramic slurry into said carrier material by using a polymeric sponge method, and said carrier material has interpenetrating pores and is made of polymer sponge.

6. The method according to claim 5, wherein said polymer sponge is of a material selected from a group consisting of polyurethane, polyvinyl chloride, polystyrene, silicone and cellulose.

* * * * *